United States Patent
Banyard et al.

(10) Patent No.: US 9,482,590 B2
(45) Date of Patent: Nov. 1, 2016

(54) OIL TRANSPORTING VAPORIZER FOR A SMOKE GENERATING APPARATUS TO DETECT LEAKS IN A FLUID SYSTEM

(75) Inventors: Richard L. Banyard, Edmonton (CA); Edward A. Murashie, Santa Ana, CA (US); Gregory M. McCollom, Anaheim, CA (US)

(73) Assignee: STAR EnviroTech, Inc., Huntington Beach, CA (US)

( * ) Notice: Subject to any disclaimer, the term of this patent is extended or adjusted under 35 U.S.C. 154(b) by 1088 days.

(21) Appl. No.: 13/608,660

(22) Filed: Sep. 10, 2012

(65) Prior Publication Data

US 2014/0069174 A1    Mar. 13, 2014

(51) Int. Cl.
| F24F 6/08 | (2006.01) |
| F22B 1/20 | (2006.01) |
| F22B 35/06 | (2006.01) |
| G01M 3/20 | (2006.01) |
| F22B 1/28 | (2006.01) |

(52) U.S. Cl.
CPC . *G01M 3/20* (2013.01); *F22B 1/28* (2013.01)

(58) Field of Classification Search
CPC ........ G01M 3/20; G01M 3/04; G01M 3/022; G01M 3/025; G01M 3/22; G01M 3/26; G01M 3/38; G01M 3/226; G01M 3/228; F22B 1/28; F41H 9/06; A63J 5/025
USPC ........ 73/40, 40.7, 47, 49.2, 49.7, 41.2, 45.4; 392/395, 397, 402, 403, 387, 386, 394; 261/141, 142, 139, 341, 35, 37, 38, 261/104, 107
See application file for complete search history.

(56) References Cited

U.S. PATENT DOCUMENTS

| 3,024,200 | A | | 3/1962 | Smith | |
| RE26,563 | E | * | 4/1969 | Seuthe | A63H 33/28 392/394 |
| 3,563,224 | A | * | 2/1971 | Bryer | G01M 9/04 126/59.5 |
| 7,305,176 | B1 | | 12/2007 | Pieroni | |
| 2004/0035179 | A1 | * | 2/2004 | Koch | G08B 29/145 73/1.05 |
| 2005/0227575 | A1 | * | 10/2005 | Pierson | A63H 19/14 446/93 |
| 2012/0201522 | A1 | * | 8/2012 | Stauffer | F41H 9/06 392/386 |

* cited by examiner

*Primary Examiner* — Hung D Nguyen
(74) *Attorney, Agent, or Firm* — Morland C. Fischer (57) ABSTRACT

An oil transporting vaporizer for a smoke generating apparatus to generate smoke to be supplied to a closed system to be tested for leaks. In a preferred embodiment, the vaporizer includes a hollow tube that is manufactured from a high temperature, fire resistant, porous material (e.g., ceramic). The vaporizer stands in a reservoir of oil such that some of the porous tube is filled with oil from the reservoir. A heater wire surrounds the outside of the porous tube above the oil within the tube. A gas (e.g., air) is blown into the porous tube and towards the oil to cause a mixture of air and gas to move through the tube. Because of its porosity, the air/oil mixture permeates the tube in the vicinity of the heater wire so as to be vaporized into smoke when the heater wire is energized.

20 Claims, 8 Drawing Sheets

OIL TRANSPORTING VAPORIZER FOR A SMOKE GENERATING APPARATUS TO DETECT LEAKS IN A FLUID SYSTEM

BACKGROUND OF THE INVENTION

1. Field of the Invention

This invention relates to an oil transporting vaporizer having particular application for use in a "smoke" generating apparatus and including a hollow tube body that is ideally manufactured from a high temperature, fire-resistant, porous material, such as ceramic, to transport oil from a reservoir thereof to a heater wire that is wound around the tube body. Oil being transported through and over the tube body is vaporized into smoke by the beater wire for delivery to a (e.g., closed fluid) system under test for leaks.

2. Background Art

Smoke generating apparatus are known for generating a visible aerosol mist to be delivered to a fluid system undergoing testing for leaks. While such apparatus are commonly described as smoke machines, it is preferable that the "smoke" be a non-toxic aerosol mist produced by evaporation and condensation at controlled temperatures rather than actual smoke which is a product of partial combustion and tends to contain toxic combustion byproducts. Hence, in the preferred embodiment to be described below, "smoke" refers to a visible aerosol mist, gas, vapor or combination thereof. Some systems that are ideal for leak testing by means of the aforementioned smoke generating apparatus are used for a motor vehicle. By observing any visible aerosol mist which exits a small and often visually imperceptible hole in the system under test, an indication is provided to the observer of the presence and location of the leak so that a repair might be made.

One example of a particular smoke producing apparatus for use in detecting leaks in a fluid system is described in U.S. Pat. No. 7,305,176 issued Dec. 4, 2007. Such a smoke producing apparatus includes a fluid transfer device which conveys a petroleum-based oil from an oil reservoir to the vicinity of a beating element so that the oil can be vaporized into smoke. The fluid transfer device described in U.S. Pat. No. 7,305,176 is generally a woven stranded fiberglass wick that is adapted to convey a supply of oil from the oil reservoir to the heating element primarily by means of capillary action to produce smoke when the heater element is energized. The fiberglass wick is described as being able to withstand temperatures as high as 1000° F.

However, the woven fiberglass wick used in the conventional smoke producing apparatus described above may ignite and burn at temperatures above 1000° F. or its fiber structures may deteriorate and melt together at temperatures below 1000° F. Consequently, at operating temperatures above 1000° F., this smoke producing apparatus could be damaged and/or the fiberglass wick may require replacement. What is more, repeatedly wetting the strands of the woven fiberglass wick with oil and subjecting the strands to thermal stress may ultimately cause the wick to tail over time so as to further necessitate replacement. Transferring oil from the reservoir to the beater element associated with the stranded fiberglass wick primarily by means of capillary action is a relatively slow process which can delay as well as limit the production of smoke. Further, the rate at which oil is transferred from the reservoir to the heater element associated with a stranded fiberglass wick primarily by means of capillary action occurs at a fixed rate for a given wick and diminishes as the wick ages. This limits the flexibility of a smoke generating apparatus which is unable to adjust its smoke delivery rate as may be required for larger or smaller test systems.

Accordingly, what is desirable is an improved oil transport and vaporizing device for use in a smoke generating apparatus, wherein the conventional capillary wick like that described above is replaced by the improved device wherein the improved device is adapted to enhance oil transport from the oil reservoir to the heating element within a time and in an amount that will improve the efficiency by which the oil is vaporized to smoke to be delivered to the system being tested for leaks, resist burning at temperatures above 1000° F., and resist deterioration at sustained temperatures below 1000° F. By virtue of the foregoing, the structural integrity of the improved device can be preserved following frequent periods of being immersed in oil and transporting the oil to die heating element so as to overcome the need for frequent replacements common to the wick-type capillary device and thereby reduce the down time of the apparatus. It is also desirable to be able to control the delivery of oil to the heating element of the improved oil transport and vaporizing device as well as die energization of the hearing element such that the production efficiency of smoke is optimized while any overheating and degradation of the oil is minimized. Further, it is desirable that the improved oil transport and vaporizing device be capable of operating at variable pressures so that the production and delivery of variable amounts of smoke can be correspondingly controlled, it is still farther desirable that the improved oil transport and vaporizing device be able to produce smoke with a narrow range of oil droplet diameters which have an optimum size for the system being tested.

SUMMARY OF THE INVENTION

In general terms, this invention relates to an oil transport and vaporizer device having particular application for use in a smoke generating apparatus for generating "smoke" to be delivered to a closed fluid system (e.g., the evaporative or air brake system of a motor vehicle) undergoing testing so that the presence and location of a leak can be detected by observing any smoke which exits the system. According to one preferred embodiment the oil transporting vaporizer device includes a hollow porous tube that is manufactured from a fire-resistant material, such as ceramic, that is adapted to resist igniting at high temperatures (e.g., above 1000° F.). The open bottom of the hollow porous tube is submerged in a (e.g., mineral) oil reservoir, and the top of the tube is sealed. A supply of air is delivered below the surface of the oil inside the hollow porous tube by way of an air delivery tube that runs through the center of the porous tube from the top. The air that is blown down the air delivery tube bubbles through the oil and carries an air/oil foam up the annular space formed between the air delivery tube and the hollow porous tube. The differential pressure between the inside and outside of the hollow porous tube forces this air/oil foam to permeate the porous tube to its outside surface.

An electrically-conductive heater wire is wound around the upper half of the ceramic tube of the oil transporting vaporizer device. One end of the heater wire is connected to an upper lug support, ring which surrounds the tube near the top thereof, and the opposite end of the heater wire is connected to a lower lug support ring which surrounds the tube near the middle thereof. An upper heater wire terminal lug is coupled to the upper lug support ring, and a lower heater wire terminal lug is coupled to the lower lug support ring. A variable controlled voltage is applied across the upper and lower heater wire terminal lugs to cause a current to flow through the beater wire, whereby to pre-heat the hollow ceramic tube adjacent the heater wire and thereby vaporize oil at the surface of the ceramic tube. The vaporized oil is subsequently condensed to produce a visible aerosol mist or the like that is commonly referred to as "smoke."

To enhance smoke production by the oil transport and vaporizer device, the voltage and current applied to the heater wire are advantageously controlled so as to produce a series of successively rising and falling (i.e., sawtooth) pulses which are optimized to enhance oil bubble contact with the heater wire while limiting peak heater wire temperature. This method of heater wire control advantageously increases the mass transfer rate of the oil transporting vaporizer device, avoids degradation of the oil that is often caused by overheating and improves the quality of the smoke by producing a smoke composed of smaller, more uniform oil mist droplets than can be produced with conventional controls.

The healer wire is preferably a linear resistance heating wire that is wound around the ceramic vaporizer body. The heater wire is driven by electronics that heat die wire to a sufficiently high temperature to vaporize the oil while maintaining a sufficiently low temperature to avoid oil degradation or combustion. A method of generating successive heater wire heating and free-falling cooling periods is used to optimize the vaporization rate and the smoke quantity while maintaining a low peak wire temperature. This temperature control is accomplished by monitoring the resistance of the heater wire and controlling the current through the wire as a function of resistance in view of the wire resistance being linearly proportional to its temperature.

Other oil transport and vaporizer devices according to additional preferred embodiments are also disclosed. In a first example, the oil transporting vaporizer includes a hollow porous fire resistant tube containing a supply of oil at the bottom thereof and having a heater wire surrounding the top. Air is blown through an air delivery tube from the bottom of the porous tube upwardly into the oil supply to cause air encapsulated oil bubbles to move upwardly from the oil supply to permeate the top of the tube in the vicinity of the heater wire by which the oil is vaporized into smoke.

In a second example, the oil transporting vaporizer includes a hollow porous fire resistant tube containing a supply of oil at the bottom (hereof and having a heater wire surrounding the top. Air is blown, downwardly from, the top of the porous tube by way of an air delivery tube so that the air is distributed by a nozzle above the oil supply within the porous tube. Some of the air is directed downwardly towards the oil supply to cause air encapsulated bubbles to move upwardly from the oil supply to permeate the top of the porous tube in the vicinity of the heater wire by which the oil is vaporized into smoke.

In a third example, the oil transporting vaporizer includes a hollow porous fire resistant tube containing a supply of oil at the bottom thereof and having a heater wire surrounding the top. Air is blown upwardly from the bottom of the porous tube by way of an air delivery tube so that the air is distributed by a nozzle above the oil supply within the porous tube. Some of the air is directed downwardly towards the oil supply to cause air encapsulated bubbles to move upwardly from the oil supply to permeate the top of the porous tube in the vicinity of the heater wire by which the oil is vaporized into smoke.

In a fourth example, the oil transporting vaporizer includes a solid porous lire resistant tube standing in an oil supply where the bottom of the porous tube is saturated with oil and the top of the tube is surrounded by a heater wire. Air is blown upwardly into the bottom of the solid porous tube by way of an air delivery tube. A mixture of air and oil is pushed upwardly so as to permeate the top of the porous tube in the vicinity of the heater wire by which the oil is vaporized into smoke.

In a fifth example, the oil transporting vaporizer includes a solid porous fire resistant tube standing in an oil supply where the bottom of the porous tube is saturated with oil. The solid porous tube is manufactured from a fire resistant material that is impregnated with a material (e.g., carbon) that is adapted to become electrically conductive in response to an electrical potential. Air is blown upwardly into the bottom of the solid porous tube by way of an air delivery tube. A mixture of air and oil is pushed upwardly through and heated infernally by the carbon-impregnated porous tube by which the oil with which the porous tube is saturated is vaporized into smoke.

In a sixth example, the oil transporting vaporizer includes a hollow porous lire resistant tube standing in an oil supply so that the tube becomes saturated with oil. The top of the tube is surrounded by a heater wire. The tube is used within a smoke generating apparatus wherein a gas is directed under pressure to the oil saturated tube by way of a gas inlet line. Some of the oil with which the tube is saturated is vaporized into smoke by the heater wire. A mixture of smoke and the gas under pressure is then blown from the tube to the system under test by way of a smoke outlet line.

DESCRIPTION OF THE PREFERRED EMBODIMENT

Described below are improved high temperature oil transport and vaporizer devices for use with conventional apparatus which is adapted to produce a supply of "smoke" for delivery to a fluid, system that is being tested for leaks. The oil transport and vaporizer devices ideally communicate with a closed fluid system, (examples being those common to a motor vehicle such as, but not limited to, the evaporative or air brake system thereof). However, it is to be understood that the smoke generating apparatus may be coupled to other closed fluid systems undergoing testing (e.g., a plumbing system), such that the smoke is delivered to the system in order to detect the presence and location of a leak by visually inspecting the system for any smoke escaping therefrom. As will now be explained, the supply of smoke is efficiently produced by virtue of die oil transporting vaporizers being capable of efficiently transporting a non-toxic petroleum-based oil (e.g., mineral oil), or the like, horn a reservoir to a heater which is associated with each of the vaporizers for causing the vaporizers to be heated and the oil to be vaporized into smoke. Further, the heater temperature is advantageously controlled to optimize the oil vaporization rate while maintaining a sufficiently low heater temperature to prevent the oil from combusting and degrading into toxic byproducts.

Figures 1, 2:
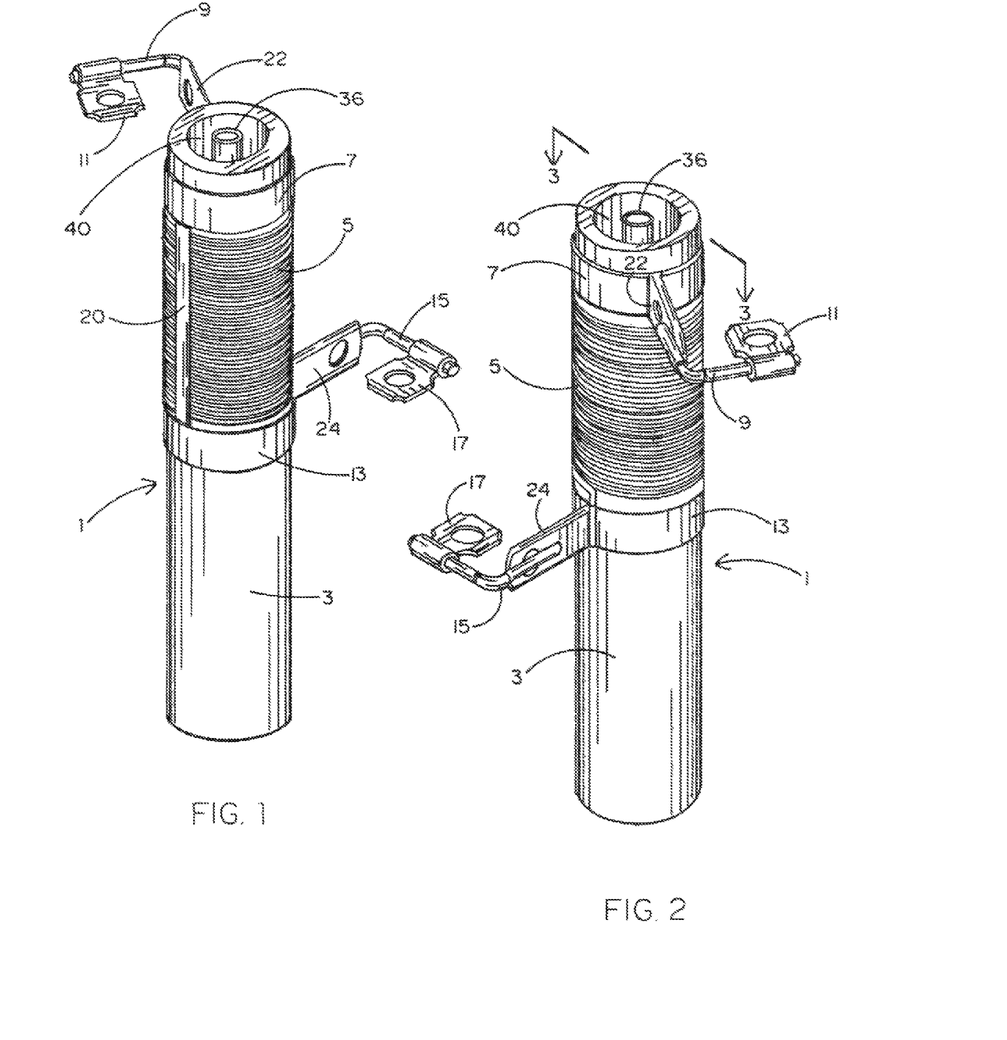
FIGS. 1 and 2 show a high-temperature oil transport and vaporizer device according to a first preferred embodiment having particular application for producing "smoke" in a smoke generating apparatus used for testing a closed system for leaks.
Figure 3:
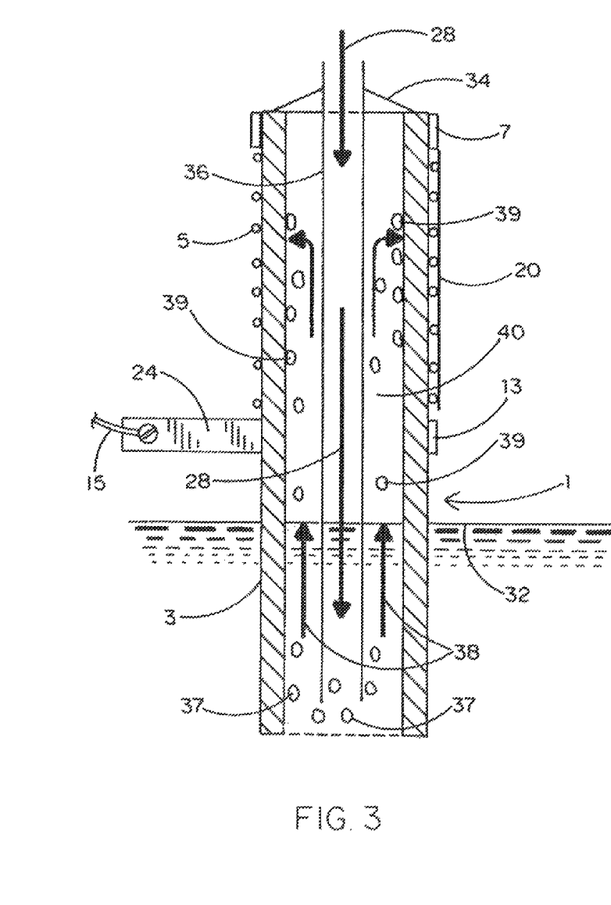
FIG. 3 shows a cross-section of the oil transport and vaporizer device taken along lines 3-3 of FIG. 2.

Turning initially to FIGS. 1-3 of the drawings, there is shown a first preferred embodiment for an improved oil transporting vaporizer 1 for use in a smoke generating apparatus. The oil transporting vaporizer 1 of FIGS. 1-3 is a rigid hollow tube 3 that is made from a porous fire-resistant (e.g., ceramic) material. As is best shown in FIG. 3, the top of the porous tube 3 is closed and the bottom is open. With the vaporizer 1 standing in a reservoir of oil 32, the bottom of the porous tube 3 will fill with oil to the level of the reservoir. By way of example only, the porous tube 3 has a height of approximately 12.0 cm and an inside diameter of approximately 1.5 cm. The porosity of tube 3 makes it ideal for use as a vaporizer device for transporting oil from a reservoir to the heater as will soon be explained. What is more, the tubular oil transporting vaporizer 1 of this invention is manufactured from a generally fire-resistant ceramic material so as to be capable of avoiding thermal degradation or igniting and burning at the same ignition temperatures (e.g., at or below 1000° F.) that are characteristic of fiberglass wick materials. In this regard, it may be recognized that it is highly atypical to employ a rigid ceramic tube like that designated 3 in FIGS. 1-3 for any fluid vaporizing application, especially in the case of transporting oil in a manner to be described from the reservoir of a smoke generating apparatus to the heater, as opposed to using a flexible fiberglass wick material as is common to conventional smoke generating apparatus.

The heater by which to vaporize the oil transported by the hollow porous ceramic tube 3 of the oil transporting vaporizer 1 is preferably an electrically-conductive wire 5 that is wound around the upper half of the tube 3. The windings of the heater wire 5 are shown wrapped in spaced parallel alignment around tube 3. One end of the heater wire 5 is attached to an upper lug support ring 7 that lies in surrounding engagement with, the oil transporting vaporizer tube 3 approximately 10.0 mm below the top thereof. A rigid electrically-conductive upper lug support rib 22 projects radially outwardly from the upper lug support ring 7. An electrical conductor 9 extends from the upper lug support rib 22 to an upper heater wire terminal lug 11 that is held by the support rib 22 so as to be spaced from the porous ceramic tube 3 of vaporizer 1.

The opposite end of the heater wire 5 around the porous ceramic tube 3 is attached to a lower lug support ring 13 that lies in surrounding engagement with tube 3 about midway between the top and bottom thereof. A rigid electrically-conductive lower lug support rib 24 projects radially outward from the lug support ring 13 so as to lie below the upper lug support rib 22. An electrical conductor 15 extends from the lower lug support rib 24 to a lower heater wire terminal lug 17 that is held by the support rib 24 so as to be spaced from the ceramic tube 3 of vaporizer 1.

The upper and lower heater wire terminal lugs 11 and 17 function, as electrical terminals across which a source of electrical voltage (designated 41 in FIG. 10) is connected. An electric current path is established between the lugs 11 and 17 and around the exterior of the porous ceramic tube 3 by way of the heater wire 5 that winds therearound. When the voltage source is energized, an electrical current will flow through the current path established by the heater wire 5. The current which flows through beater wire 5 generates heat which in turn causes any oil in contact with the heater wire 5 as well as the porous ceramic tube 3 of the oil transporting vaporizer 1 to be correspondingly heated. Therefore, oil being supplied by the tube 3 from the oil reservoir of the smoke generating apparatus will be vaporized into smoke for delivery to the fluid system undergoing testing for leaks. As was previously pointed out, the term "smoke" as used herein may be any suitable visible aerosol mist, vapor or gas. Moreover, and as was also previously described, the ceramic composition of vaporizer device 1 advantageously enables the vaporizer device to avoid burning at the same temperature at which some conventional stranded fiberglass wicks are known to burn or ignite or fatigue at continuous temperatures less than 1000° F.

One or more vertical strips 20 of (e.g., ceramic) adhesive are applied along the exterior of the porous ceramic tube 3 of the oil transport and vaporizer device 1 so as to ran between the upper and lower lug support rings 7 and 13 and cover the heater wire 5. The adhesive strips 20 prevent a displacement of the lug support rings 7 and 13 and the heater wire 5 which extends therebetween relative to the exterior of the tube 3 of the oil transporting vaporizer 1.

Not only can the oil transport and vaporizer device 1 of this invention resist burning at the same temperature at which some conventional stranded fiberglass wicks will burn, but the porosity which is characteristic of the porous ceramic tube 3 enhances oil transport from the interior of the tube to the neater wire 5 around the exterior surface of the tube as an air/oil foam. What is more, and unlike some conventional stranded flexible fiberglass wicks, a relatively large volume of oil can also be continuously supplied from the reservoir thereof and upwardly through the inside of the hollow tube 3 to the heater wire 5.

More particularly, by delivering a carrier gas (e.g., air or an inert gas such as nitrogen, argon or carbon dioxide) downwardly towards the oil 32 with which, the bottom, of the porous ceramic tube 3 is filled, a column of air/oil foam is correspondingly forced at a relatively high speed upwardly through the interior of porous ceramic tube 3. By way of particular example, air is pumped in the direction of the reference arrows 28 of FIG. 3 (e.g., by means of an electric air pump, a compressed air source or the like) downwardly through the porous tube 3 by way of an air delivery tube 36 which runs through the porous tube 3 for its entire length. A seal (e.g., a compression washer) 34 is located at the top of the porous tube 3 in surrounding engagement with the air delivery 36. Air is pumped through the air delivery tube 36 below the surface of the oil 32 within the porous tube 3 so that air bubbles 37 are created within the oil. A mixture of air and oil is pushed upwardly from the bottom of the air delivery tube 36 in the direction of the reference arrows 38. Accordingly, a foam containing air encapsulated oil bubbles 39 moves above the oil surface 32 and upwardly along the inside of the porous tube 3, such that some of the air/oil foam will permeate die porous tube 3 in the vicinity of the heater wire 5. Any oil which comes into contact with the heater wire 5 outside the tube 3 will be vaporized to form smoke to be delivered to the system being tested for leaks. The transfer of the air/oil foam from the interior to the exterior of the porous tube 3 is aided by surface tension forces acting through the porosity of the tube 3.

Thus, a copious supply of oil is quickly and efficiently transported by the porous ceramic tube 3 of the oil transport and vaporizer device 1 to the heater wire 5 surrounding the tube by which the oil can be vaporized to produce a relatively generous supply of smoke to be delivered to the system being tested for leaks. Because of the fire-resistant nature and solid construction of the porous ceramic tube 3, the oil transporting vaporizer 1 will require replacement less often than some conventional stranded fiberglass wicks, or even some high temperature resistant fiberglass wicks, which tend to disintegrate over time and frequent wetting.

A further beneficial feature of the oil transport and vaporizer device 1 is that the co-flowing air/oil foam transfer of the oil to the beater wire 5 enhances the uniformity of oil contact with the heater wire 5 wound around the outside of the porous ceramic tube 3. This feature improves the rate at which oil can be vaporized, even while operating with a relatively low heater wire temperature, thus increasing smoke production rate, decreasing oil degradation and also permitting the vaporizer 1 to produce smoke with a uniformly small droplet diameter. Accordingly, the smoke opacity for a given quantity of oil is increased and the working lifetime of the smoke is prolonged because smaller diameter droplets settle out more slowly. These advantages are not readily available with conventional fiberglass wicks because they rely only on capillary action to transport oil and do not have a co-flowing gaseous phase.

A farther beneficial feature of the oil transport and vaporizer device 1 herein disclosed is the ability to be able to adjust the oil delivery rate and thus die smoke supply rate by independently adjusting the flow rave of the air 28 being delivered by the air delivery tube 36 downwardly towards the oil surface 32 inside the vaporizer rube 3. Alternatively, the effective oil delivery rate can be adjusted by changing the position of the air delivery tube 36 relative to the oil surface 32 or by adjusting the proportion of the air 28 being delivered through the tip of the air delivery tube 36 or through vents (not shown) in the side of the tube which directs air away from the oil surface. This adjustment enables control of the smoke quantity for systems being tested which demand larger or smaller quantities of smoke for an adequate test. Such adjustment also allows for control of the smoke density or opacity whenever needed.

In the embodiment shown by FIG. 3, the co-flowing air 28 is pumped downwardly below the surface of the oil 32 in the porous tube 3 by way of the air delivery tube 36, whereby an annular space 40 is formed between the air delivery tube 36 and the vaporizer tube 3 such that the air/oil foam passes upwardly through the annular space. Alternate configurations for the oil transporting vaporizer 1 of FIG. 3 could include vaporizer bodies having a non-circular cross-sectional shape which can offer advantages of greater surface area. Another alternate configuration could include vaporizer bodies with a non-uniform shape such that the cross-sectional profile could vary with height, offering changes in internal flow shape and area or external surface shape and area which are advantageous for the purposes of the vaporizer device.

Figure 4:
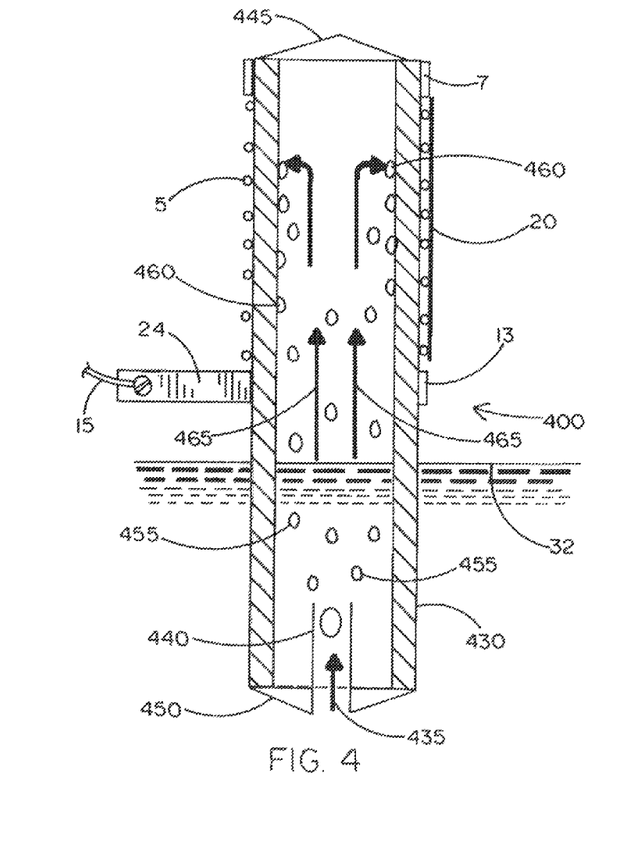
FIGS. 4-8 show cross sections of other configurations for high temperature oil transport and vaporizer devices to produce smoke according to additional preferred embodiments of this invention.

Additional preferred embodiments for an oil transporting vaporizer are described when referring to FIGS. 4-8 of the drawings. Identical reference numerals have been used to describe features of the oil transporting vaporizers of FIGS. 4-8 which are common to the oil transporting vaporizer 1 of FIG. 3. FIG. 4 shows an oil transporting vaporizer 400 having a hollow porous fire resistant (e.g., ceramic) tube 430 which is standing in a reservoir of oil 32. Some of the oil fills the bottom of the vaporizer 400 by way of the porous tube 430. In the case of vaporizer 400, air is blown in the direction of reference arrow 435 from a location below the bottom of the porous rube 430 upwardly and into the oil 32 within tube 430 by way of an air delivery tube 440. The top of the porous tube 430 is closed by a seal 445 which extends thereacross. The bottom of the porous tube 430 is also closed by a seal 450 which surrounds the air delivery tube 440.

The incoming air 435 produces air bubbles 455 within the oil 32, such that a mixture of air and oil is blown towards the surface of the oil. Accordingly a foam containing air encapsulated oil bubbles 460 moves above the oil 32 and upwardly in the direction of the reference arrows 465 along the inside of the porous tube 430. Some of the air/oil foam will permeate the porous tube 430 and contact the heater wire 5 outside the tube to be vaporized to form smoke for delivery to the system being tested for leaks.

Figure 5:
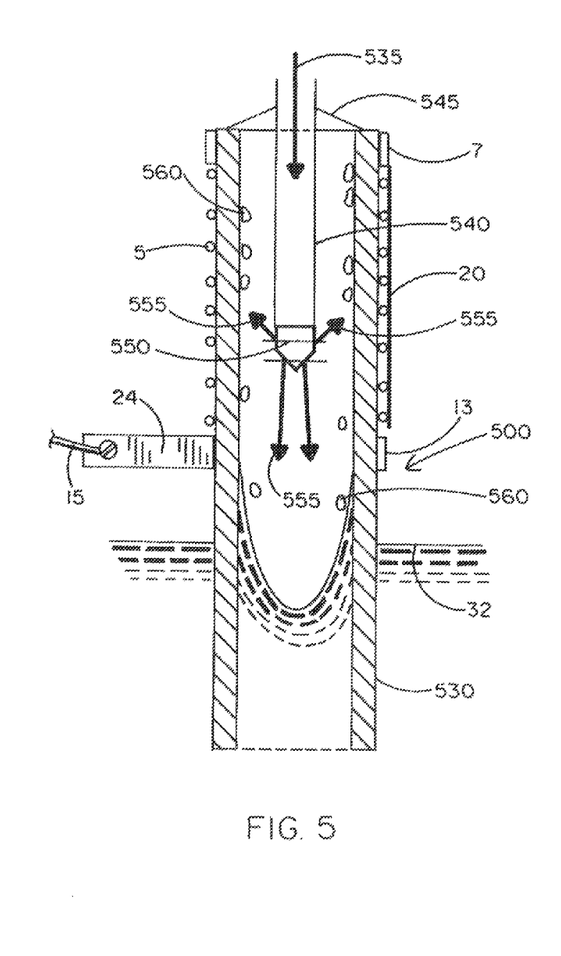

FIG. 5 shows an oil transporting vaporizer 500 having a hollow porous fire resistant (e.g., ceramic) tube 530 which is standing in a reservoir of oil 32. In the case of the vaporizer 500, air is blown in the direction of reference arrow 535 from a location above the top of the tube 530 downwardly through an air delivery tube 540. The top of the porous tube 530 is closed by a seal 545 which surrounds the air delivery tube 540, and the bottom of die tube 530 is open and submerged in the oil 32.

The incoming air 535 is supplied to an air distribution nozzle 550 located inside the porous tube 530 at the end of the air delivery tube 540 above the oil 32 therewithin. The air distribution nozzle 550 directs the incoming air throughout the porous tube 530 in the directions of the reference arrows 555. Some of the incoming air is directed downwardly towards the oil 32 inside the porous tube 530. Accordingly, the surface of the oil 32 is parabolically shaped so as to cause a foam containing air encapsulated oil bubbles 560 to travel upwardly along the inside of the porous tube 530. Some of the air/oil foam will permeate the porous tube and contact the heater wire 5 outside the tube to be vaporized to form smoke for delivery to the system being tested for leaks. The transfer of the air/oil loam from the interior to the exterior of the porous tube 530 is aided, by the force generated by the air 535 that is blown down the air delivery tube 530 and out from the air distribution nozzle 550.

Figure 6:
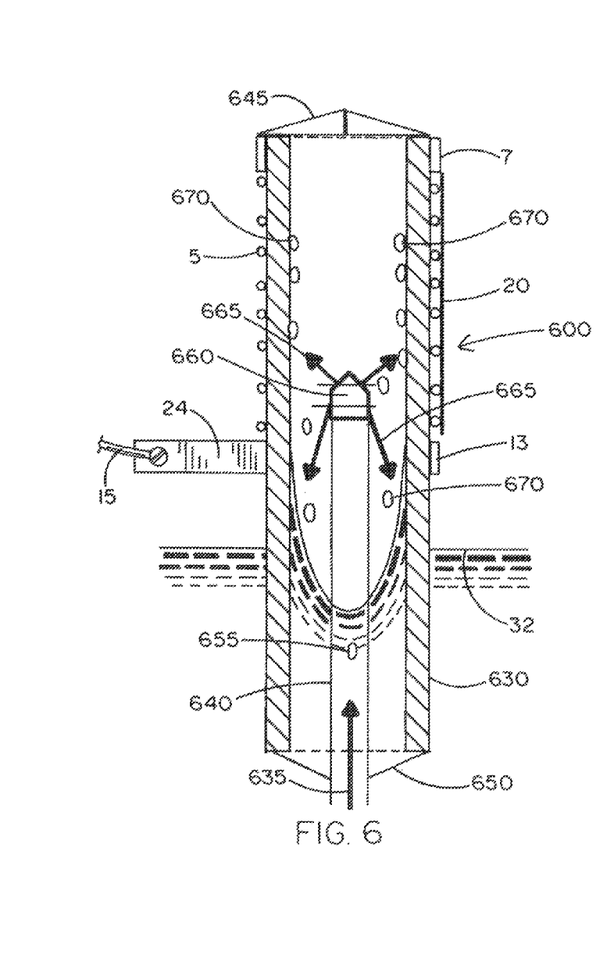

FIG. 6 shows an oil transporting vaporizer 600 which is a variation of the vaporizer 500 of FIG. 5. The vaporizer 600 of FIG. 6 has a hollow porous fire resistant (e.g., ceramic) tube 630 which is standing in a reservoir of oil 32. Some of the oil 32 permeates the porous tube 3 and fills the bottom of the vaporizer 600. In this case, air is blown in the direction of reference arrow 635 from a location below the bottom of the porous tube 630 upwardly through an air delivery tube 640 to fill tube 630 above the surface of the oil 32 therewithin. The top of the porous tube 630 is closed by a seal 645, and the bottom of the tube 630 is closed by another seal 650 which surrounds the air delivery tube 640. An optional orifice 655 is formed in the air delivery tube 640 through which some of the oil 32 at the bottom of the porous tube 630 is suctioned.

The incoming air 635 is supplied to an air distribution nozzle 660 located inside the porous tube 630 at the end of the air delivery tube 640 above the oil 32. The air distribution nozzle 660 directs the incoming air throughout the porous tube in the directions of the reference arrows 665. Some of the incoming air 635 is directed downwardly towards the oil 32 inside the porous tube 630. As in the case of the vaporizer 500, the surface of the oil 32 within the porous tube 630 of the vaporizer 600 is parabolically shaped so as to cause a foam containing air encapsulated oil bubbles 670 to move upwardly along the inside of the porous tube 630. Some of the air/oil foam will permeate the porous tube 630 and contact the heater wire 5 outside the tube to be vaporized to form smoke for delivery to the system being tested for leaks. The transfer of the airfoil foam from the interior to foe exterior of the porous tube 630 is aided by the force generated by the incoming air 635 mat is blown up the air delivery tube 635 and out from the air distribution nozzle 660.

Figure 7:
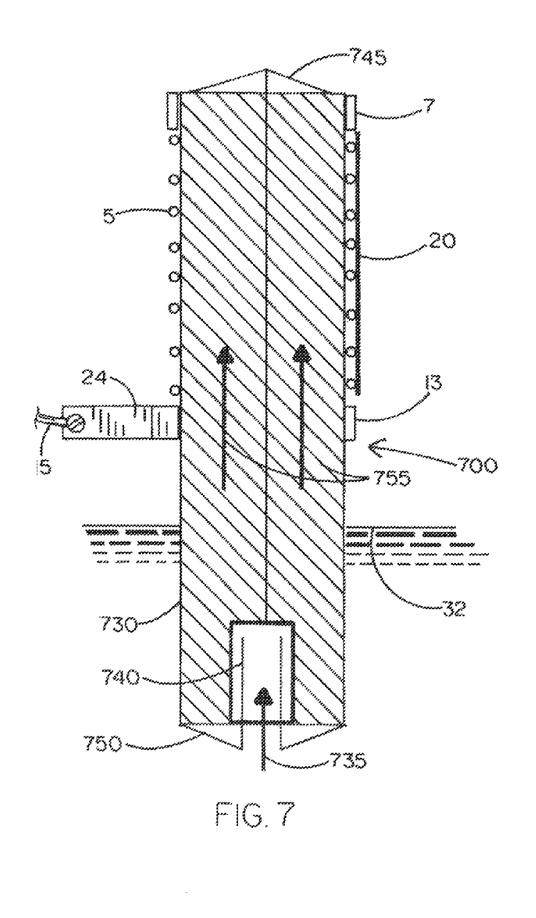

FIG. 7 shows an oil transporting vaporizer 700 having a solid porous fire resistant (e.g., ceramic) body 730 rather than a hollow tubular body like that of the oil transporting vaporizers 1, 400, 500 and 600 of FIGS. 3-6. The vaporizer 700 is standing in a reservoir of oil 32 such that some of the oil permeates the bottom of the porous body 730. In this case, air is blown in the direction of reference arrow 735 from a location below the bottom of the porous body 730 upwardly through an air delivery tube 740 that lies below the surface of the oil 32 and extends inwardly of body 730. The top of the porous body 730 is closed by a seal 745, and the bottom of the body 730 is closed by another seal 750 which surrounds the air delivery tube 740.

A mixture of the incoming air 735 and the oil 32 which permeates the vaporizer 700 is pushed upwardly through the solid porous body 730 and carried with the aid of a wicking action in the direction of the reference arrows 755 such that the vaporizer 700 becomes saturated with oil. Because both the top and bottom of the porous body 730 are sealed, some of the air/oil mixture is forced outwardly therefrom in the vicinity of the heater wire 5 which surrounds the porous body 730. The oil which contacts the heater wire 5 is vaporized to form smoke for delivery to the system being tested for leaks.

Figure 8:
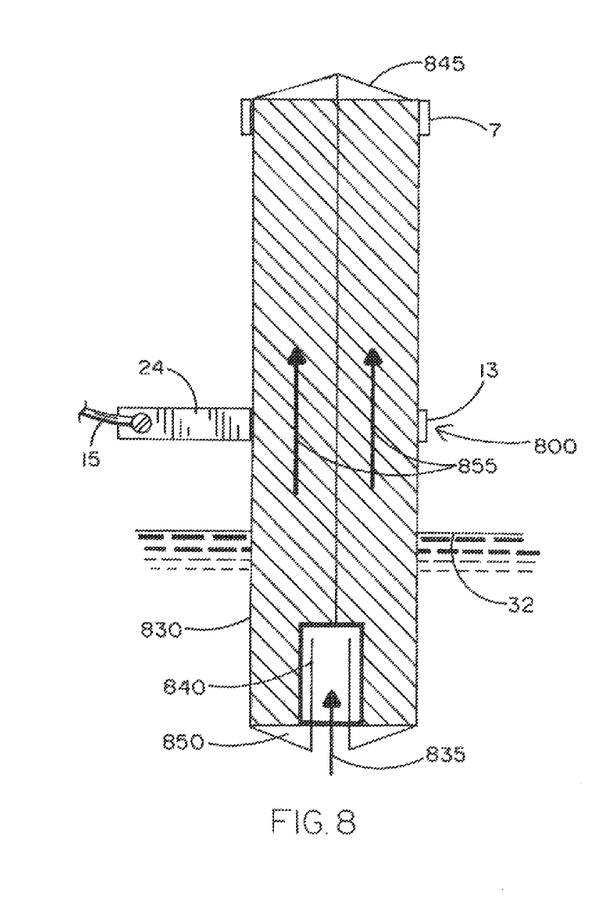

FIG. 8 shows an oil transporting vaporizer 800 which, like the vaporizer 700 of FIG. 7, has a solid porous body 830. However, in the case of the vaporizer 800 of FIG. 8, the porous body 830 is manufactured from a material containing a conductive material or materials, such as carbon or the like. By way of example, the solid porous body 830 is manufactured from a lire resistant material (e.g., ceramic) that is impregnated with a slurry of carbon. Because the ceramic-impregnated carbon will have an electrically conductive characteristic (when an electrical potential is applied across the porous body 830), heat can be generated internally throughout the porous body 830, whereby the external heater wire (designated 5 in FIGS. 3-7) may be eliminated from the outside of the vaporizer 800.

The oil transporting vaporizer 800 is standing in a reservoir of oil 32 such drat some of the oil permeates the porous tube 830 and fills the bottom of the vaporizer 800. Air is blown in the direction of reference arrow 835 from a location below the porous body 830 upwardly through, an air delivery tube 840 that lies below the surface of the oil 32 and extends inwardly of body 830. The top of the porous body 830 is closed by a seal 843, and the bottom of the body 830 is closed by another seal 850 which surrounds the air delivery tube 840. A mixture of the incoming air 835 and the oil 32 which permeates the vaporizer 800 is pushed upwardly and carried with the aid of a wicking action through the solid porous body 830 in the direction of the reference arrows 855 such that die vaporizer 800 becomes saturated with oil. Because the top and bottom of the porous tube 830 are sealed, when the ceramic-impregnated carbon becomes electrically conductive and generates heat, the oil with which the vaporizer 800 is saturated will be vaporized to form smoke which is forced outwardly from the porous body 830 for delivery to the system being test for leaks.

Figure 9:
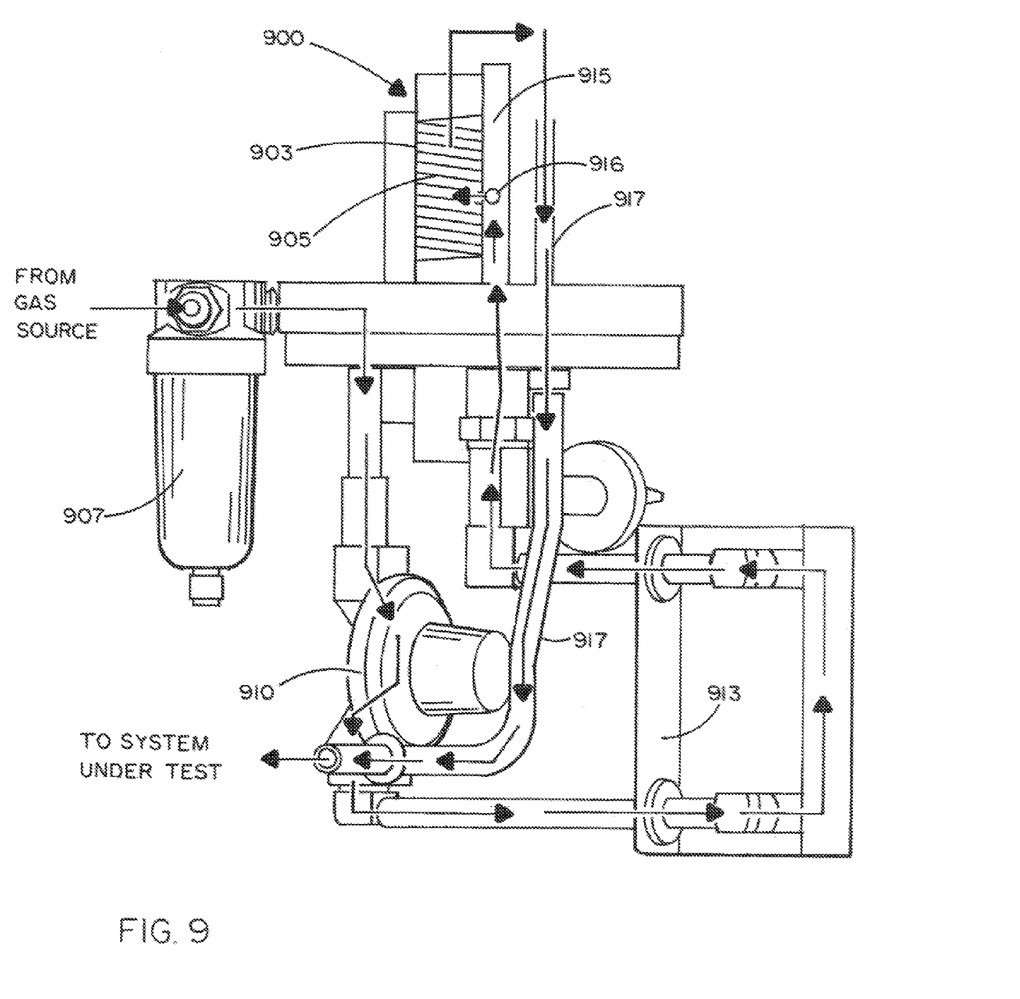
FIG. 9 shows an example of a smoke generating apparatus having another high temperature oil transport and vaporizer device to produce smoke.

FIG. 9 of the drawings shows one example of a smoke generating apparatus having an oil transport and vaporizer device so that oil which is supplied to the device can be heated and vaporized into smoke for delivery to a system under test. The oil transporting vaporizer 900 of FIG. 9 has a hollow tubular body 903 that is manufactured from a solid porous fire resistant (e.g., ceramic) material. The vaporizer 900 is standing in a reservoir of oil (not shown in FIG. 9) such that some of the oil permeates the bottom of the porous body 903. However, unlike the oil transporting vaporizers 1, 400, 500 and 600 of FIGS. 3-6, the hollow body 903 of vaporizer 900 is devoid of an air delivery tube running through the interior thereof. A heater wire 905 that is connected across the terminals of a voltage source is wound around (at least) the upper half of the body 903 of vaporizer 900.

The smoke generating apparatus of FIG. 9 includes a gas inlet side and a smoke outlet side. The gas inlet side includes a filter 907 that is connected to a source of gas, such as compressed air or an inert gas such as nitrogen, argon or carbon dioxide. Gas from the source is supplied to a pressure regulator 910 by way of the filter 907. The pressure regulator 910 is connected to a flow regulator 913. A regulated supply of gas is delivered from the flow regulator 913 to the vaporizer 900 by way of a gas inlet line 915. In particular, the bottom of the gas inlet line 915 is coupled to the flow regulator 913, and the top of the gas inlet line is closed. An orifice 916 is formed in the gas inlet line 915 through which a stream of gas under pressure is blown towards the heater wire 905 which is wound around the body 903 of the vaporizer 900.

Oil which permeates the porous body 903 of the vaporizer 900 travels upwardly therealong by means of a wicking action until the vaporizer is saturated with oil. When the heater wire 905 which surrounds the body 903 of the vaporizer 900 is energized by the voltage source to produce heat, the oil with which the vaporizer is saturated will be vaporized to form smoke. The gas which is blown from the orifice 916 in the gas inlet line 915 towards the vaporizer 900 will penetrate the porous hollow body 903 thereof and blow the smoke upwardly and outwardly from the vaporizer into the smoke outlet side of the smoke generating apparatus.

The smoke outlet side of the smoke generating apparatus includes a smoke outlet line 917 through which a mixture of gas and smoke is blown from the vaporizer. The gas and smoke mixture which exits the smoke outlet line 917 is delivered to the system being tested for leaks. While the smoke generating apparatus of FIG. 9 includes a vaporizer 900 having a hollow tubular body 903 to which gas under pressure is directed (via the gas inlet hue 915) and from which a mixture of gas and smoke is blown (via the smoke outlet line 917), it is to be recognized that the smoke generating apparatus can be modified to accommodate other ones of the oil transport and vaporizer devices that are illustrated in FIGS. 3-8, whether the vaporizers are solid or hollow to receive an air delivery tube therewithin.

Figure 10:
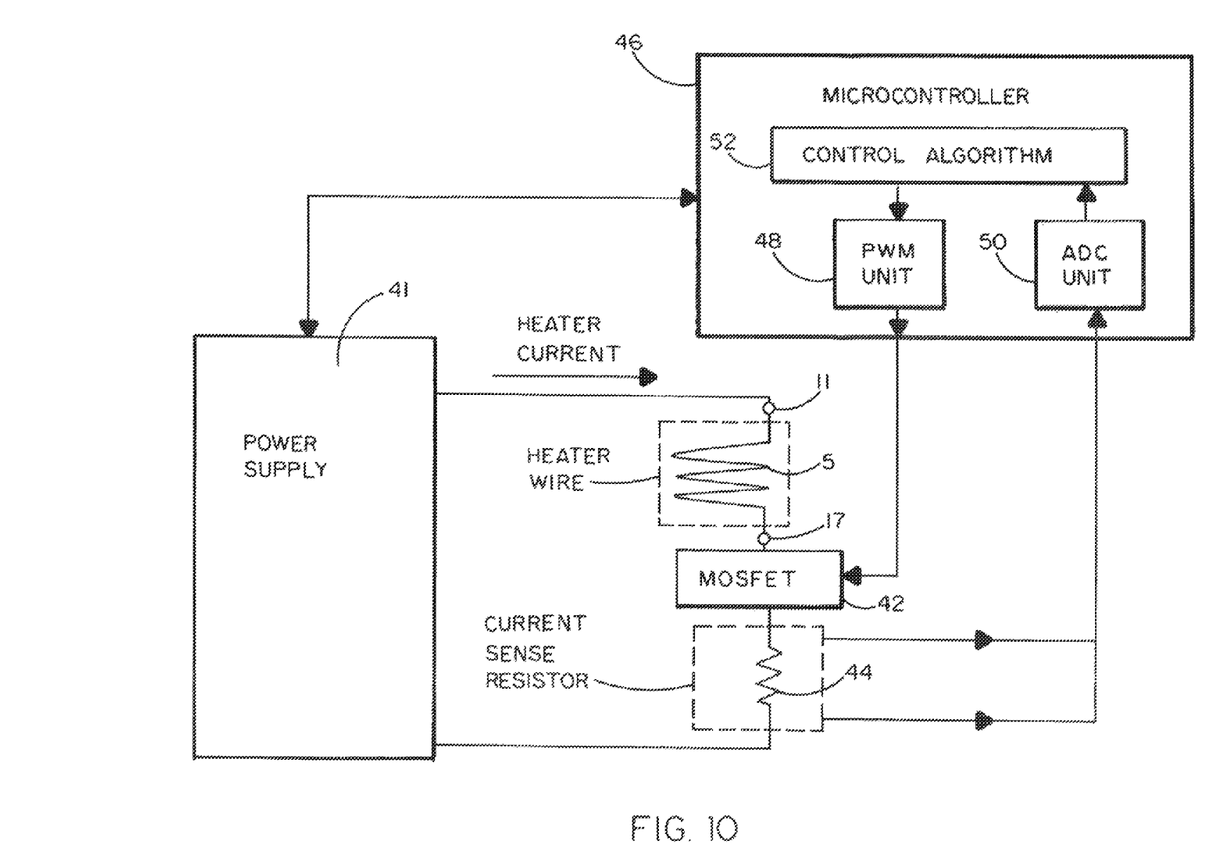
FIG. 10 is a schematic diagram of circuitry for controlling the smoke produced by the oil transport and vaporizer device of FIGS. 1-3.
Figure 11:
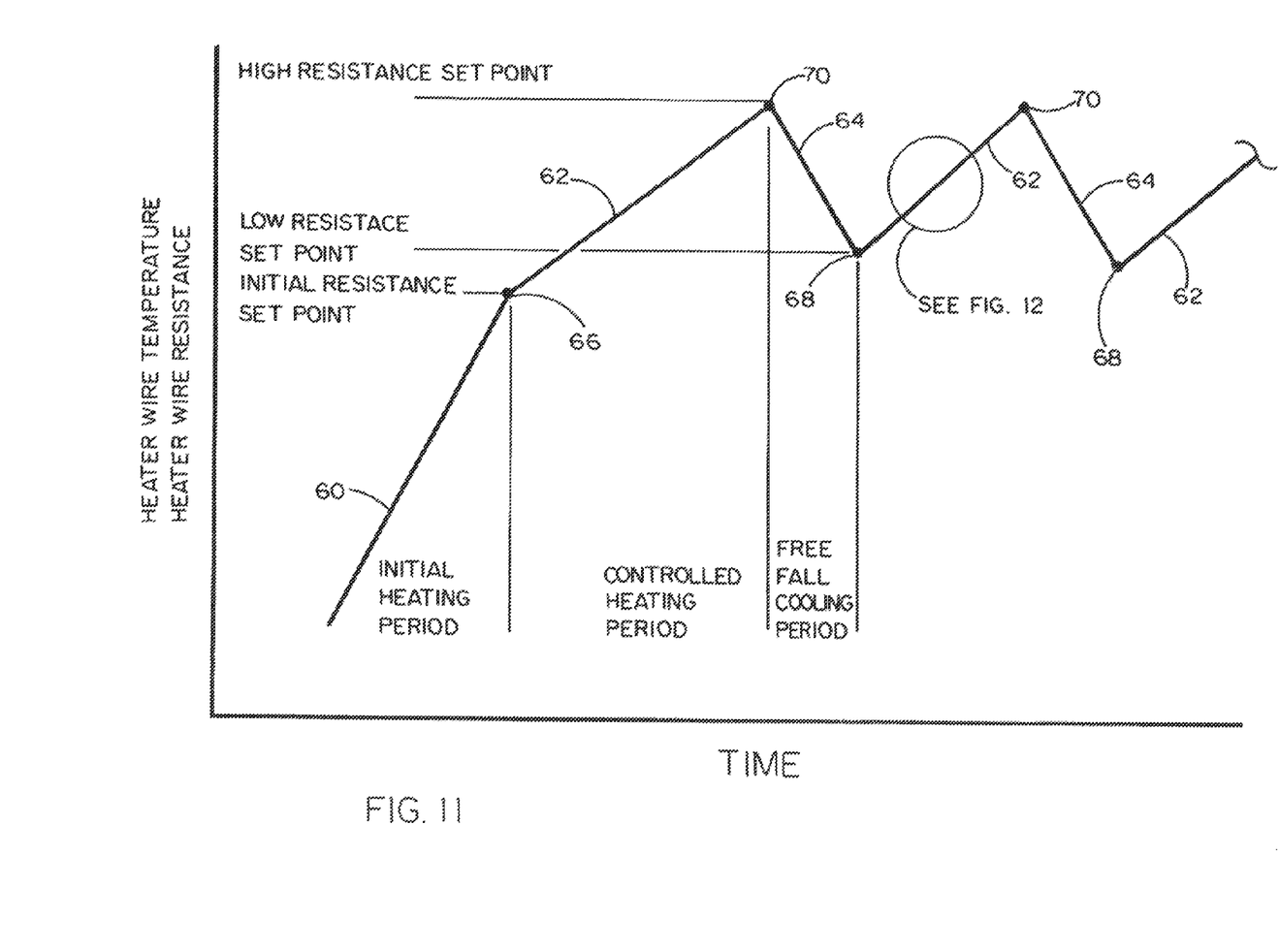
FIG. 11 is a diagram that is illustrative of the average controlled current of the heater of the oil transport and vaporizer device of FIGS. 1-3.

FIGS. 10 and 11 of the drawings illustrate an example of a system for electrically controlling the heater wire 5 of the oil transporting vaporizer 1 of FIG. 3. Although the heater wire control system is described below with particular reference to the vaporizer 1 of FIG. 3, the control system is also applicable to the oil transporting vaporizers 400, 500, 600, 700 and 900 of FIGS. 4-7 and 9. As shown in FIG. 10, heater current is supplied by a power supply 41 connected to the heater wire 5 across the heater wire terminal lugs 11 and 17 (of FIGS. 1 and 2). The heater current passes through the heater wire 5, a series connected current control device such as a metal oxide semiconductor field effect transistor (MOSFET) 42, and a current sensing device such as a resistor 44 before returning to the power supply 41. The heater current is controlled by a microcontroller 46 which includes a pulse width modulator (PWM) control, unit 48, an analog-to-digital converter (ADC) measurement unit 50, and an algorithm 52 to control the microcontroller 46 and thereby enable the precise measurement and control of heater wire temperature cycles. The microcontroller 46 operates in repeated cycles of a real time operating system (RTOS) such that the control algorithm 52 runs during each cycle at a pace set by a clock (not shown) that is internal to the microcontroller. To this end, the control algorithm 52 must be capable of controlling the current through heater wire 5 while measuring the temperature of heater wire 5.

The current through heater wire 5 is controlled by activating the PWM unit 48 to vary the time during which the current control MOSFET 42 is switched on or off. When MOSFET 42 is turned off, an open circuit condition is created and no current flows through heater wire 5. When MOSFET 42 is turned on, a closed circuit condition is created and the current which now flows through heater wire 5 is equal to the voltage output of power supply 41 divided by the sum of the resistances of the series connected heater wire 5. MOSFET 42 and current sense resistor 44. Since the "on" resistance of MOSFET 42 and the resistance of the current sense resistor 44 are both very low relative to the resistance of heater wire 5, the heater wire current when MOSFET 42 is turned on is essentially equal to the voltage of power supply 41 divided by die resistance of heater wire 5. The average current through heater wire 5 is thusly proportional to the heater wire current with the MOSFET 42 turned on multiplied by the fraction of time during which MOSFET 42 is turned on. The PWM unit 48 has the capability of switching MOSFET 42 on for a fraction of each PWM clock cycle between 0 and 100%. The microcontroller 46 typically has a resolution of 1 part in 255 in order to be able to control the average current from 0 to 100% of the on heater wire current calculated in steps of about 0.4% of the on heater wire current.

The heater wire 5 described herein is preferably a linear resistive heating wire such that the resistance of wire 5 is linearly proportional to its temperature. Further, it is preferable that the MOSFET 42 have a negligible resistance when it is turned on and that the current sense resistor 44 have a much lower resistance than the resistance of the heater wire 5. With these linearizing characteristics and a fixed output voltage from the power supply 41, the heater wire resistance can be calculated depending upon the voltage across current sense resistor 44 measured by the microcontroller ADC unit 50. In this case, the resistance of heater wire 5 is calculated as the known resistance of the sense resistor 44 multiplied by the ratio of the known voltage output of the power supply 41 divided by the measured voltage across the current sense resistor 44 when the MOSFET 42 is turned on.

Hence, the microcontroller 46 can measure the temperature of the heater wire 5 by causing the PWM unit 48 to turn on the MOSFET 42 and, while the MOSFET 42 is on, using the ADC unit 50 to measure the voltage across the current sense resistor 44. The temperature of heater wire 5, which is directly proportional to the measured voltage, can be calculated by multiplying the measured voltage across the current sense resistor 44 by the appropriate numeric factor. Alternatively, the measured voltage of current sense resistor 44 may be used in the control algorithm as a direct analog for the temperature of the heater wire. The use of a linear heater wire 5 simplifies the control hardware and the control algorithm while enabling controlled operation over a wide temperature range. However, a non-linear heater wire (not shown) may also be used in place of the linear heater wire 5.

In the preferred embodiment, a control algorithm 52 in microcontroller 46 monitors the temperature of heater wire 5 and drives the heater wire current to achieve a controlled fluctuation in the heater wire temperature to optimize smoke production from the bubbling air/oil foam being delivered from the inside to the exterior surface of the hollow porous tube 3 of the oil transport and vaporizer device 1 in the vicinity of heater wire 5. A mathematical expression that is representative of a suitable control algorithm 52 is listed at the end of this specification.

A schematic representation of a heater wire temperature profile having successive rising and falling temperatures is illustrated by the graph of FIG. 11 which shows a desired temperature profile for heater wire 5 over a short period of time. The temperature profile in FIG. 11 would be the same for both the heater wire resistance and the heater wire temperature so long as a linear heater wire is used. The graph of FIG. 11 shows an initial hearing period 60 followed by a repeated rising and falling (i.e., sawtooth) pattern, of controlled heating periods 62 and free fail cooling periods 64 which promote optimized oil bubble contact with the heater wire 5 while limiting the peak heater wire temperature.

Figure 12:
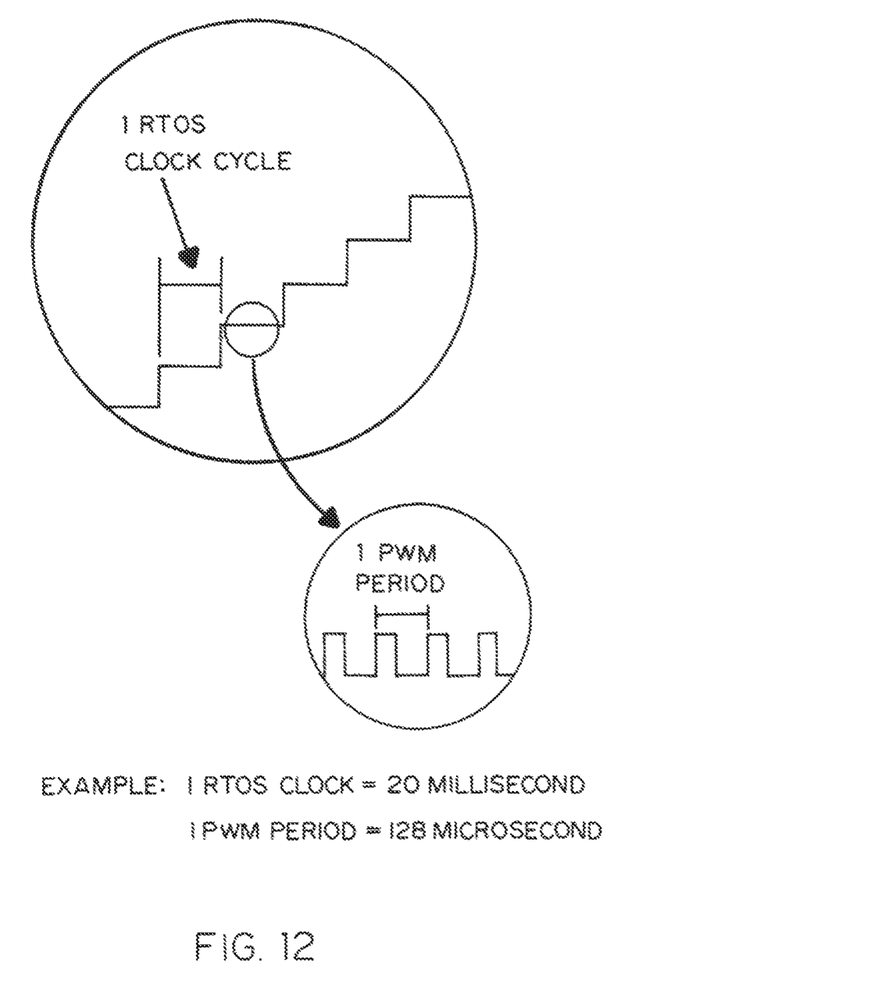
FIG. 12 is an enlarged detail taken from the diagram of FIG. 11.

Referring concurrently to FIGS. 10-12 of the drawings, during the initial heating period 60, the PWM unit 48 of microcontroller 46 is set to turn MOSFET 42 on and to keep it on for a steady, high PWM duty cycle (such as 80% on) or to operate MOSFET 42 with a continuously increasing PWM duty cycle (such as ramping up from 0% towards 100% by increasing the PWM duty cycle on each RTOS clock cycle in the manner shown in FIG. 12). This process continues until the temperature of heater wire 5 reaches an initial temperature set point (corresponding to the initial resistance set point 66 for a linear heater wire). As shown in FIG. 11, the initial resistance set point 66 is lower than the low resistance set point 68 subsequently used to control, the temperature of heater wire 5. However, the initial resistance set point 66 could be the same as or higher than the low resistance set point 68.

Once the resistance of heater wire 5 has surpassed the initial resistance set point 66, the control algorithm 52 in microcontroller 46 switches from initial heating mode to temperature control mode. Temperature control is achieved by repeatedly switching between a controlled heating mode to raise the heater wire resistance to a high resistance (temperature) set point 70 and a free tali cooling mode which lowers the wire resistance to the low resistance (temperature) set point 68. To achieve the controlled heating mode, the PWM duty cycle is initialized at a low value (such as 16% duty cycle or 40 out of 255) and is increased by a fixed step (such as 0.4% or 1 out of 255) on each RTOS clock cycle. This series of PWM pulses with progressively increasing tractions of on time correspondingly raises the average current and thus increases the temperature and resistance of the heater wire 5 as shown by the rising ramps of the pulses during the controlled heating periods 62 in FIG. 11.

When, the measured wire resistance exceeds the high resistance (temperature) set point 70, the control algorithm 52 switches to cooling mode. In cooling mode, the PWM unit sets the PWM duty cycle at a steady, low value (such as 10% duty cycle or 25 out of 255) which provides an average heater wire current that is insufficient to maintain wire temperature. This provides the free fall cooling periods 64 shown in FIG. 11 which lasts until the heater wire resistance falls below the low resistance (temperature) set point 68 and the control algorithm 52 switches back to the controlled heating mode.

The sequence of controlled heating and free fall cooling periods 62 and 64 is continuously repeated until the power supply 41 is shut off. The algorithmic increasing pulses of the heater wire temperature profile are optimized to maximize contact of the air encapsulated oil bubbles 39 with, the heater wire 5 based upon the molecular elasticity of the oil within the vaporizer 1. It should be appreciated that the heater wire temperature/resistance hues shown in FIG. 11 represent average heater wire resistance (temperature) and that the temperature is actually driven by brief PWM pulses (best shown in FIG. 12) that are turned on and off many times during each RTOS clock cycle. Hence, the actual wire temperature and resistance would also be driven to vary in a stepwise pattern on a shorter time cycle as shown by the detailed portion of the controlled heating period 62 of FIG. 11 that is enlarged, in FIG. 12.

It should also be appreciated that the use of a fluctuating heater wire temperature like that shown in FIG. 11 is substantially different from the on-off (bang-bang), PI and PID controls previously used by conventional smoke generating machines, whereby the method herein disclosed for controlling the heater wire 5 provides the oil transport and vaporizer device 1 with distinct advantages. These advantages include a greater vaporization efficiency while maintaining a lower heater wire temperature, thus improving the smoke generating output while reducing thermal degradation of the oil. Further, the use of a microcontroller (46 in FIG. 10) permits a relatively easy modification of the control algorithm to account for such features as resistance (temperature) limits and step rates as may be required to adapt the operation of the vaporizer device 1 for different conditions such as a change in required smoke quantity or a change of carrier gas composition, operating temperature, operating pressure or oil properties, such as temperature, viscosity, etc.

The repeated process of heating and then cooling the heater wire 5 within a defined range and with a defined ramp rate allows the heater wire to progressively heat more and more of the oil film and bubbles in the vicinity of the heater wire as the wire becomes hotter, thus rapidly increasing the supply of vaporized oil. During each freefall cooling period (64 of FIG. 11), oil is vaporized less rapidly and the air/oil team being delivered through the porous vaporizer tube 3 can reach the surface and form oil bubbles and oil film on the vaporizer body surface closer to the heater wire. This provides a supply of bubbling oil for vaporization during the nest heating cycle while also keeping the porous ceramic matrix and the oil cool enough to avoid degradation of the oil and the loss of any tell-tale fragrance or dye added thereto before the oil is vaporized. The combination of air/oil foam delivery to the heater wire 5 and periodic heating of the wire has been found to advantageously produce a high oil vaporization rate with excellent control of the mist droplet size distribution, providing an optimum smoke production.

Once the oil has been vaporized by the heater wire 5 of the oil transporting vaporizer 1, if must be condensed to form a mist or smoke consisting of very small liquid droplets in a gaseous carrier. The process of cooling the vaporized oil to die point where liquid droplets form is accomplished, by entraining die vaporized oil into a co-flow of cooler gas. The carrier gas is typically air, although a non-reactive inert gas such as nitrogen or carbon dioxide may be used in cases where the oxygen in air or the associated moisture would be undesirable. The process of cooling the vaporized oil to the point where liquid droplets form is accomplished by entraining the vaporized oil into a co-flow of cooler gas. Liquid hydrocarbon droplets in the presence of a saturated hydrocarbon vapor might be nucleated by various methods. One is condensation onto solid "seed" particles such as fine dust already present in the gas. Another is condensation onto pre-existing liquid seed droplets such as might be produced by the filaments and droplets of liquid released by bursting bubbles at the exterior surface of the vaporizer tube. Alternatively, in clean gas with no pre-existing liquid seed droplets, droplet, nucleation can occur from, the accumulation of "clusters" of vapor molecules which are loosely held together by hydrogen bonding until they grow large enough to develop some surface tension and thus behave like a liquid droplet, capturing adjacent vapor molecules. Droplets forming by means of seedless clusters tend to have a characteristic range of droplet diameters depending on the vapor concentration and other factors at the time of nucleation.

A desirable attribute of smoke generating apparatus is the ability to generate mist droplets which are of a uniform size that is optimum for visibility during testing and for the durability of the smoke. Smoke composed of optimum size droplets produces the greatest volume of visible smoke for a given consumption of oil. Beyond the simple efficiency of consuming minimal quantities of oil droplets sized for optimum visibility also provide the least occupational health concern for exposure to the smoke and the least concern for oil contamination of the space being tested for leaks. Further, enhanced durability of the smoke allows for longer test periods before the oil droplets which form the smoke settle out onto surfaces in the system being tested. This advantage may ultimately allow the smoke to be vented out of the test space at the end of testing to further minimize concerns relating to occupational health exposure and oil contamination. The rate at which oil mist droplets settle out of the smoke is given by Stokes Law from which a calculation can be made of the settling velocity for a spherical particle in a gas according to droplet diameter, droplet density, gas viscosity and gas density. Stokes Law is commonly known in fluid mechanics and gives an indication of settling velocity, V, of a droplet in a gas according to the equation, $V=g*d^2(\rho_d-\rho_g)/(18\mu)$ where g is the gravitational acceleration, d is the droplet diameter, $\rho_d$ is the droplet density, $\rho_g$ is the gas density and $\mu$ is the gas viscosity.

The optimum size of the oil droplets in smoke may vary in different situations but, by way of an example, a droplet diameter of about 1 micrometer is believed to be to achieve satisfactory results for leak testing automotive fluid systems at normal atmospheric conditions. When smoke contains droplets which are significantly larger than optimum, substantially more oil is consumed, (since droplet volume is proportional to the cube of droplet diameter), and die smoke durability is substantially reduced, (since droplet settling rate is proportional to the square of droplet diameter).

| CONTROL ALGORITHM 52 | |
|---|---|
| control( ) | // 20msec control loop |
| { | |
| if(control_mode=0) { | // if preheat mode |
| if(resistance<preheat_resistance) { | // and resistance is less than fixed preheat value |
| if(pwm < 255) | // and pwm less than max value |
| pwm ++; | // increment the pwm value |
| } | |
| else if(resistance>preheat_resistance) { | // else if the preheat resistance value is met |
| control_mode = 1; | // go to cooling mode |
| pwm = pwm_min; | // and set the pwm to a low level to let temp freefall |
| } | |
| } | |
| else { | // not in preheat mode |
| if(control_mode=1) { | // if cooling mode |
| if(resistance<cool_resistance) { | // and if resistance less than a cool set value |
| control_mode=2; | // then go to heating mode |
| control_speed=set_speed | // set PWM change rate |
| } | |
| } | |
| else { | // else in heating mode |
| if(resistance>warm_resistance) { | // and if resistance greater than warm set value |
| control_mode = 1; | // go to cooling mode |
| pwm = pwm_min; | // and set the pwm to a low level to let temp freefall |
| } | |
| else { | // else not up to temp |
| if((--control_speed)=0) { | // if the decrement pwm change rate value is zero |
| control_speed=set_setting; | // then reset pwm speed setting |
| if(pwm < 255) | // and if the pwm is not max value, increment it |
| pwm = pwm ++; | |

The invention claimed is:

1. A smoke generating apparatus to generate smoke for delivery to a closed system by which to test the system for leaks, said apparatus including an oil reservoir containing a supply of oil and an improvement comprising:
   a vaporizer having a hollow oil transporting body that has a top and a bottom and an interior and an exterior and communicates with the oil reservoir so that at least some of said hollow oil transporting body is filled with oil, said hollow oil transporting body being manufactured from a porous material so that oil from said oil reservoir travels form the bottom towards the top of said porous hollow oil transporting body and permeates said porous hollow oil transporting body from the interior thereof to the exterior;
   a heater element coupled to the exterior of said porous hollow oil transporting body to be energized to heat said porous hollow oil transporting body and thereby vaporize into smoke the oil which permeates said porous hollow oil transporting body in the vicinity of said heater element at the exterior of said porous hollow oil transporting body; and
   force generating means located at the inside of said porous hollow oil transporting body of said vaporizer to generate a force to cause the oil with which the porous hollow oil transporting body of said vaporizer is filled to move through said porous hollow oil transporting body and towards said heating element at which the oil is vaporized into smoke when said heating element is energized.

2. The smoke generating apparatus recited in claim 1, wherein the porous hollow oil transporting body of said vaporizer is manufactured from a solid fire resistant material.

3. The smoke generating apparatus recited in claim 1, wherein the porous hollow oil transporting body of said vaporizer is manufactured from a porous ceramic material that is capable of being permeated with the oil within said porous hollow oil transporting body.

4. The smoke generating apparatus recited in claim 1, wherein said heater element is an electrically conductive heater wire wound around the exterior of the porous hollow oil transporting body of said vaporizer, said heater wire adapted to produce the heat for heating said porous oil transporting body in response to an electrical current flowing through said heater wire.

5. The smoke generating apparatus recited in claim 4, further comprising a first electrical terminal connected to one end of said electrically conductive heater wire and a second electrical terminal connected to the opposite end of said heater wire, such that an electrical voltage connected across said first and second electrical terminals causes the electrical current to flow through said heater wire to heat the porous hollow oil transporting body of said vaporizer and thereby vaporize the oil into smoke.

6. The smoke generating apparatus recited in claim 5, further comprising a first terminal support ring extending around the porous hollow oil transporting body of said vaporizer, said first electrical terminal connected to and supported by said first terminal support ring; and a second terminal support ring being spaced from said first terminal support ring and extending around said porous hollow oil transporting body, said second electrical terminal being connected to and supported by said second terminal support ring.

7. The smoke generating apparatus recited in claim 1, wherein said force generating means includes means for blowing a gas towards the oil with which the porous hollow oil transporting body of said vaporizer is filled, said oil being blown and moved by said gas through said porous hollow oil transmitting body towards said heater element at which the oil is vaporized into smoke when said heating element is energized.

8. The smoke generating apparatus recited in claim 7, wherein the gas being blown by said force generating means towards the oil within the porous hollow oil transporting body of said vaporizer is a non-reactive, inert gas.

9. The smoke generating apparatus recited in claim 7, wherein the gas being blown by said force generating means towards the oil within the hollow oil transporting body of said vaporizer is blown upwardly and into the oil within said body.

10. The smoke generating apparatus recited in claim 7, further comprising a gas delivery tube running through the top of the hollow oil transporting body of said vaporizer to a location below the surface of the oil within said body, said force generating means blowing said gas downwardly through said gas delivery tube and into the oil within said body so that the oil is carried by said gas and moved upwardly through said body towards said heater element.

11. The smoke generating apparatus recited in claim 7, wherein the gas being blown by said force generating means towards the oil within the porous hollow oil transporting body of said vaporizer is blown from a location above and downwardly towards the oil within said porous hollow oil transmitting body.

12. The smoke generating apparatus recited in claim 7, further comprising a gas delivery tube running through the top of the porous hollow oil transporting body of said vaporizer to a location above the surface of the oil within said porous hollow oil transmitting body, said force generating means blowing said gas downwardly through said gas delivery tube and into the oil within said porous hollow oil transmitting body so that the oil is carried by said gas and moved upwardly through said porous hollow oil transmitting body towards said heater element.

13. The smoke generating apparatus recited in claim 7, further comprising a gas delivery tube running through the bottom of the hollow oil transporting body of said vaporizer to a location above the surface of the oil within said body, said force generating means blowing said gas upwardly through said gas delivery tube so that the oil within said body is carried by said gas and moved upwardly through said body towards said heater element.

14. The smoke generating apparatus recited in claim 1, further comprising a power supply connected to said heater element and control circuitry connected to said power supply to control the temperature of said heater element at which the oil which moves through said porous hollow oil transporting body is vaporized into smoke, said control circuitry causing a series of current pulses to be supplied from said power supply to said heater element to energize said heater element during successive heating and cooling temperature cycles so that said heater element experiences increasing and tailing temperature fluctuations during each temperature cycle.

15. The smoke generating apparatus recited in claim 14, wherein said beater element is an electrically conductive linear resistance heating wire to which said series of current pulses is supplied from said power supply during said successive heating and cooling temperature cycles.

16. The smoke generating apparatus recited in claim 15, wherein said control circuitry includes a transistor switch connected in electrical series with said power supply and said linear resistance heating wire, said transistor device being turned on and off during each of said successive heating and cooling temperature cycles, whereby said series of current pulses is supplied to said beating wire to cause said increasing and falling temperature fluctuations during each temperature cycle.

17. The smoke generating apparatus recited in claim 16, wherein said control circuitry also includes a pulse width modulator and a microcontroller to control the operation of said pulse width modulator, said pulse width modulator connected to said transistor switch to cause said switch to be turned on and turned off during each of said successive heating and cooling temperature cycles.

18. The smoke generating apparatus recited in claim 17, wherein said control circuitry also includes a current sense resistor connected in electrical series with each of power supply, said linear resistance heating wire and said transistor switch, said control circuitry further including an analog-to-digital converter connected between said current sense resistor and said microcontroller, said analog-to-digital converter providing to said microcontroller a measurement of the voltage across said current sense resistor when said transistor switch is turned on.

19. The smoke generating apparatus recited in claim 18, wherein said microcontroller is adapted to determine the temperature of said linear resistance heating wire depending upon the voltage across said current sense resistor measured by said analog-to-digital converter and provided to said microcontroller, said microcontroller controlling the current pulses being supplied by said power supply and flowing through said linear resistance heating wire in response to the temperature of said heating wire.

20. A smoke generating apparatus to generate smoke for delivery to a closed system by which to test the system for leaks, said apparatus including an oil reservoir containing a supply of oil and an improvement comprising:
  a vaporizer having a hollow oil transporting body that is manufactured from a porous ceramic fire resistant material and communicates with the oil reservoir so that at least some of the porous ceramic hollow oil transporting body is filled and saturated with oil;
  a heating element surrounding said porous ceramic hollow oil transporting body to be energized to heat said oil transporting body; and
  force generating means located at the inside of said porous ceramic hollow oil transporting body to generate a blowing force to cause the oil with which the porous ceramic hollow oil transporting body of said vaporizer is filled and saturated to move through and permeate said porous ceramic hollow oil transporting body for receipt adjacent said heating element at which the oil is vaporized into smoke when said heating element is energized.

* * * * *